R. SHAVE & F. T. PULLAR.
ROPE BEARER GRIP FOR USE IN SECURING LOADS ON VEHICLES.
APPLICATION FILED DEC. 12, 1912.
1,095,679.
Patented May 5, 1914.
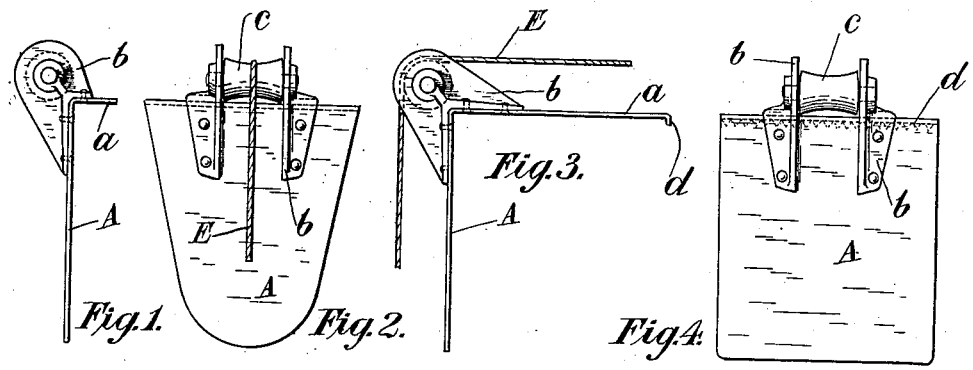
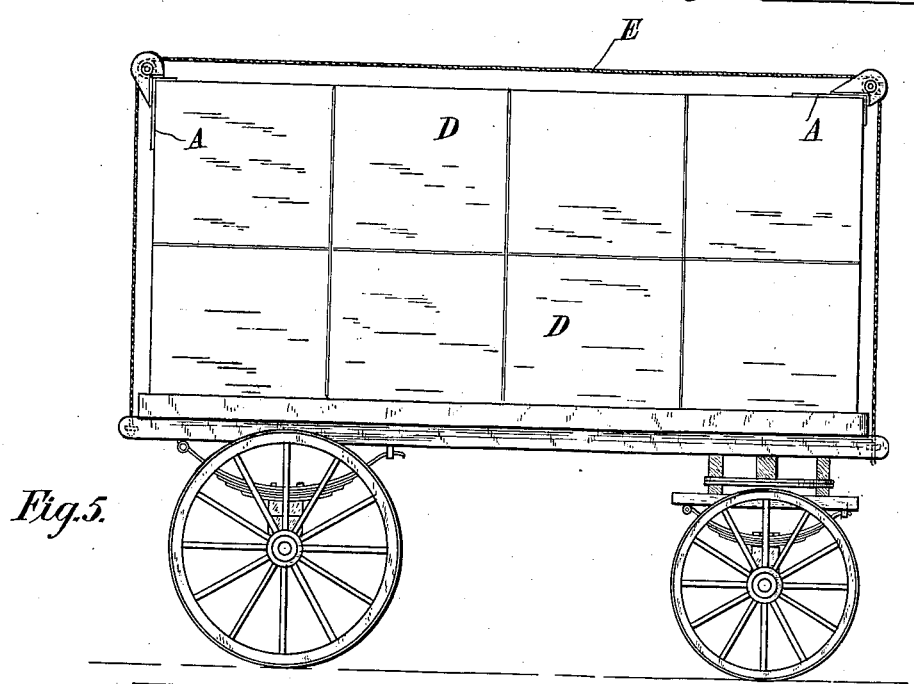
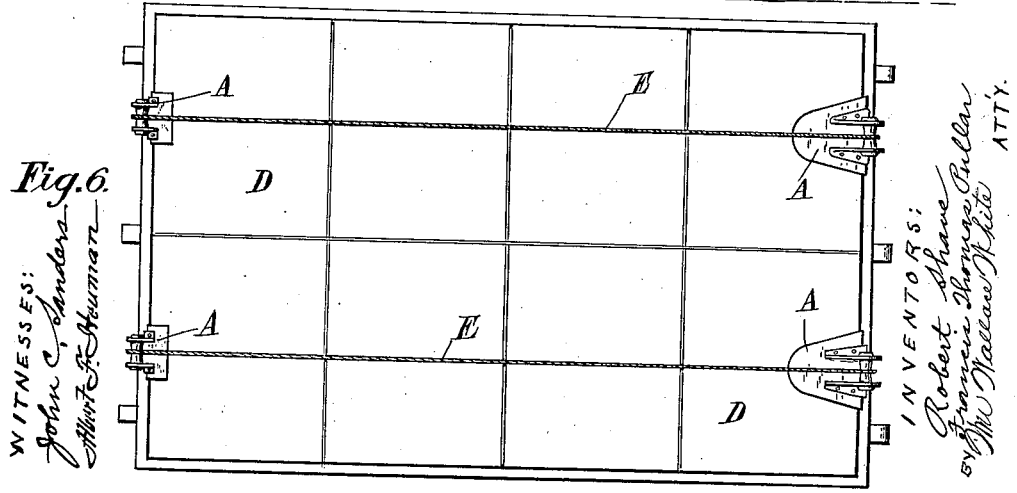

UNITED STATES PATENT OFFICE.

ROBERT SHAVE, OF SHEPPARTON, AND FRANCIS THOMAS PULLAR, OF ARDMONA, VICTORIA, AUSTRALIA.

ROPE-BEARER GRIP FOR USE IN SECURING LOADS ON VEHICLES.

1,095,679.  Specification of Letters Patent.  Patented May 5, 1914.

Application filed December 12, 1912. Serial No. 736,265.

*To all whom it may concern:*

Be it known that we, ROBERT SHAVE, residing at High street, Shepparton, mechanical engineer, and FRANCIS THOMAS PULLAR, residing at "Rosebank," Ardmona, fruit grower, both in the British State of Victoria, Commonwealth of Australia, and subjects of the King of Great Britain and Ireland, have invented a new and useful Improved Rope-Bearer Grip for Use in Securing Loads on Vehicles, of which the following is a specification.

This invention of improved rope bearer grips for use in securing loads on vehicles has been designed to allow the ropes used in conjunction with them to secure the load to slide easily over the corner rollers of the grips so that the ropes may be pulled more tightly than usual with the expenditure of less labor and with less damage to ropes and load. These rope bearer grips are constructed of pieces of angle metal each equipped at the outer angle with brackets or formed with brackets to carry rollers upon which the ropes lie and slide. One of these rope bearer grips is used on every corner of the load over which a rope has to be pulled taut while the loose ends of the ropes are secured to ring fastenings or to rollers carried in brackets affixed to the van or lorry to enable them to be drawn tightly with a minimum of labor and damage to ropes.

The invention will now be fully described aided by a reference to the attached sheet of drawings in which, Figure 1 is an end view and Fig. 2 a side view of one form of the rope bearer grips, and Figs. 3 and 4 similar views of a modified construction thereof, while Fig. 5 is a side view and Fig. 6 a plan illustrating the position and use of the rope bearer grips on a rope bound loaded vehicle.

In these figures A are the rope bearer grips each constructed preferably of an angle plate *a* having a pair of bracket cheeks *b* riveted to it or formed integral with it, while *c* is the roller, preferably cast on their spindles, and which latter work in the eye bearing provided in said bracket cheeks *b*. Said rollers are hollowed or smaller in diameter at their longitudinal center than at their ends to cause the ropes to run to the center of the roller and not slip therefrom.

In Figs. 5 and 6 the load is shown made up of boxes D secured by ropes E passing over the angle grips A.

In the event of the rope bearer grips being used on irregularly shaped loads or in places where they are liable to slip, the edge of the angle plate may be equipped with teeth or serrations *d* to enable them to grip the material or boxes forming the load.

Having now described our invention, what we claim as new and desire to secure by Letters Patent is:—

1. A rope bearer grip for use in securing loads on vehicles consisting of an angle plate with a hollowed roller mounted between brackets thereon, the edges of said angle plate being provided with inwardly extended teeth whereby the grip will be held against movement substantially as described and shown.

2. Rope bearer grips for assisting ropes in securing loads on vehicles consisting of angle grips A each made of an angle plate *a* having bracket cheeks *b* supporting a concaved roller *c* upon which the bend or turn of the rope bears while the ends thereof are secured to ring fastenings on the front and back of the vehicle substantially as described and shown.

In testimony whereof we have signed our names to this specification in the presence of two subscribing witnesses.

ROBERT SHAVE.
FRANCIS THOMAS PULLAR.

Witnesses:
BEDLINGTON HODGCOMB,
W. J. S. THOMPSON.